United States Patent

Ronn

[11] Patent Number: 5,892,875
[45] Date of Patent: Apr. 6, 1999

[54] FILTERING CONNECTION TO OPTICAL LIGHT CABLE

[76] Inventor: Avigdor M. Ronn, 27A Bond St., Great Neck, N.Y. 11021

[21] Appl. No.: 777,257

[22] Filed: Dec. 31, 1996

[51] Int. Cl.⁶ .................................................. G02B 6/36
[52] U.S. Cl. .............................. 385/115; 385/140; 385/70
[58] Field of Search .................................. 385/56–60, 73, 385/74, 75, 76, 140

[56] References Cited

U.S. PATENT DOCUMENTS 5,113,476  5/1992  Okada et al. ........................... 385/140

*Primary Examiner*—John Ngo
*Attorney, Agent, or Firm*—Christopher R. Pastel; Shu Muk Lee

[57] ABSTRACT

A filtering connection to optical light cable is a body having a hollow bore extending through the body, with a single or multicomponented optical element positioned coaxially in the hollow bore. An interior threaded portion with a standard thread is formed at one end of the hollow bore while an exterior threaded portion with a mating standard thread is formed about the other opposite end of the hollow bore.

13 Claims, 2 Drawing Sheets

FILTERING CONNECTION TO OPTICAL LIGHT CABLE

BACKGROUND

This invention is directed to a simple filtering connection to optical light cable. In particular, this invention is directed to a connection device to an optical light cable that converts a light source to a narrower spectral light source.

Medical applications often require specialized light with particular light spectral characteristics. Hospital operating theaters and physicians' offices often contain commercial off-the-shelf broadband wavelength light sources. Such light sources are manufactured by such companies as Karl Storz and Pillin. The light sources typically allows one (or a plurality of) light cables (typically a fiber bundle or liquid core) to be connected to the light output of the light source.

The fiber bundles are connected to the light output by way of a threaded connection. The threaded connection connects the fiber bundle to lead the light output to a given application's instrument for subsequent illuminating use.

A typical conventional fiberoptic bundle connection 1, is shown in FIG. 1. Fiberoptic bundle connection 1 includes a body 2 with a threaded bore 15 having a standard thread 3. Coaxial to threaded bore 15 is an end of a fiberoptic bundle 4 that is fixed to body 2 by a standard fiber connection (SMA).

Standard thread 3 can vary between manufacturers, but within each manufacturer's product line each manufacturer keeps to such manufacturer's standard thread. Accordingly, standard thread 3 is understood to be a standard for a particular manufacture. The present invention is effective for any given standard thread.

The bulb in the commercial light sources are usually a xenon short arc which is very bright in the blue end of the spectrum. However, there are many applications that require a particular light spectral output. As an example, the excitation source for a fluorimeter should include light of only a narrow spectral range so that a particular chemical species can be excited. Another application is in the use of light to test for particular light sensitivities.

Commercial light sources can serve as the excitation source for any fluorimeter if the light output from the fiberoptic cable bundle is filtered to allow only the spectral window of interest to be delivered. For example, the PhotoDynamic Therapy ("PDT") drug Foscan® needs light at 421 nm.

Presently, such filtering is performed after the light output has been transported by the fiberoptic bundle. The filter must be incorporated into the apparatus, for a particular application, at the delivery end of the fiberoptic bundle. Consequently, complexity and cost is added to each application's apparatus because each application must build in the structure and space for the filter. Further, the filters are often duplicated within such applications that require different tools even though the different tools nonetheless require the same spectral light.

OBJECTS AND SUMMARY OF THE INVENTION

It is an object of the present invention to overcome the limitations of the prior art.

It is an object of the present invention to provide a filtering connection to optical light cables that filters light spectrally before the light is transported by the optical light cable.

It is an object of the present invention to provide a filtering connection that is inexpensive and allows easy change of light filters. The filtering connection of the present invention allows easy removal and insertion of a light filter. However, the filtering connection of the present invention is easily manufactured. Consequently, the filtering connection of the present invention can be cost effective when used as individual spectral connections where the particular filter is left in a particular filtering connection. Coding can be built into the present invention to enable particular spectral connections be identified easily.

Briefly stated, a filtering connection to optical light cable is a body having a hollow bore extending through the body, with a single or multicomponented optical element positioned coaxially in the hollow bore. An interior threaded portion with a standard thread is formed at one end of the hollow bore while an exterior threaded portion with a mating standard thread is formed about the other opposite end of the hollow bore.

According to an embodiment of the present invention, there is provided a filtering connection to connect a fiberoptic bundle connection to a standard thread, the filtering connection comprises a body having a stepped bore extending from a first side of the body to an opposite side of the body, the stepped bore having at least two interior diametered portions, a larger interior diametered portion extending from a larger opening on the first side of the body, and a smaller interior diametered portion extending from a smaller opening on the opposite side of the body, a standard threaded portion formed on the larger interior diametered portion and extending from the larger opening, a standard threaded portion formed on the body concentric to the smaller opening and extending from the opposite side, and an optical element coaxial to the stepped bore and positioned in close proximity to an end of the larger interior diametered portion away from the larger opening.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT(S)

Figure 1:
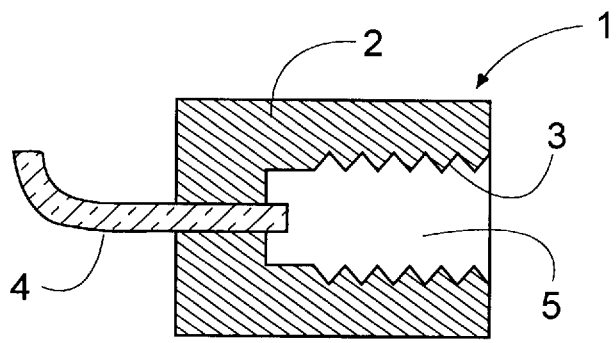
FIG. 1 is a sectional view of a conventional fiberoptic bundle connection.
Figure 2:
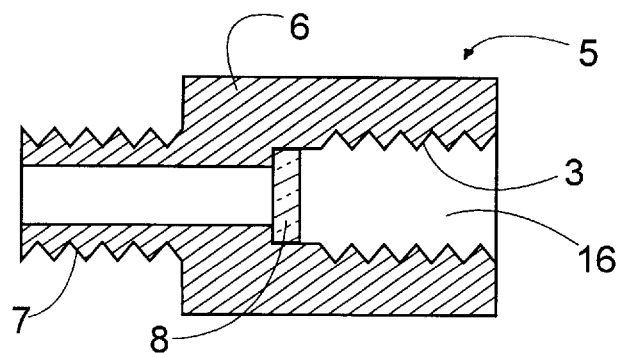
FIG. 2 is a sectional view of a filtering connection of the present invention.

Referring to FIG. 2, a filtering connection 5 of the present invention comprises a body 5 which includes a stepped hollow through bore 16. Stepped hollow bore 16 includes at least two interior diametered portions. A standard threaded portion is formed at the opening end of the larger interior diametered portion. A mating thread to the standard threaded portion is formed on a surface portion 7 of body 5 at the opposite opening end to the opening end of the larger interior diametered portion. That is, surface portion 7 is formed at the opening end of the smaller interior diametered portion. An optical element 8 is located within the larger interior diametered portion in close proximity to the end of the larger interior diametered portion away from the opening end of the larger diameter. In this embodiment, the optical element is a finger pressure push fit within the larger diameter.

Figure 3:
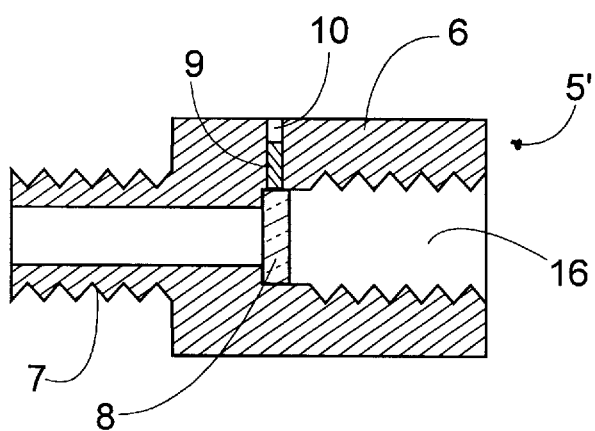
FIG. 3 is a sectional view of a filtering connection of the present invention.

Referring to FIG. 3, a filtering connection 5' of the present invention includes at least one set screw hole 10 effective to secure optical element 8 in the larger interior diametered portion of stepped hollow through bore 16, in close proximity to the end of the larger interior diametered portion away from the opening end of the larger diameter, when a set screw 9 is tightened in set screw hole 10. One set screw hole is generally enough, however, a multitude of screw holes can advantageously distribute forces more equally so as to not cause uneven stresses to optical element 8. Further, if optical element 8 is multicomponent, more than one set screw may be required to maintain alignment of the components.

Figure 4:
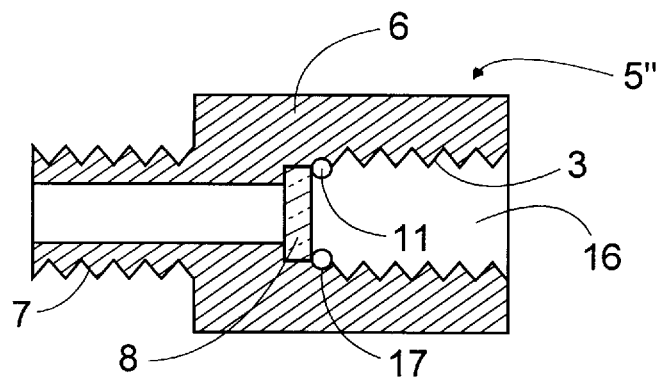
FIG. 4 is a sectional view of a filtering connection of the present invention.

Referring to FIG. 4, a filtering connection 5" of the present invention includes an elastic O-ring 11 effective to secure optical element 8 in the larger interior diameter of stepped hollow through bore 16, in close proximity to the end of the larger interior diametered portion away from the opening end of the larger diameter. O-ring 11 optionally seats in an O-ring groove 17 positioned appropriately to secure optical element 8 against the end of the larger interior diametered portion of stepped hollow through bore 16. Without O-ring groove 17, O-ring 11 secures optical element 8 by friction or by the pressure of the standard threaded fixture that standard thread portion 3 threads on.

Figure 5:
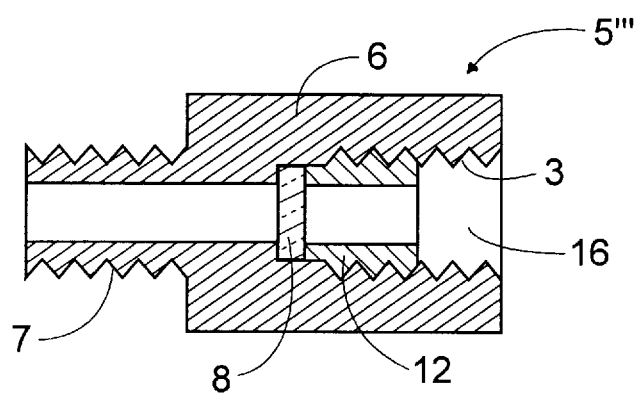
FIG. 5 is a sectional view of a filtering connection of the present invention.

Referring to FIG. 5, a filtering connection 5''' of the present invention includes a retaining ring 12 effective to secure optical element 8 in the larger interior diameter of stepped hollow through bore 16, in close proximity to the end of the larger interior diametered portion away from the opening end of the larger diameter, when retaining ring 12 is tightened into the larger interior diameter of stepped hollow through bore 16.

Figure 6:
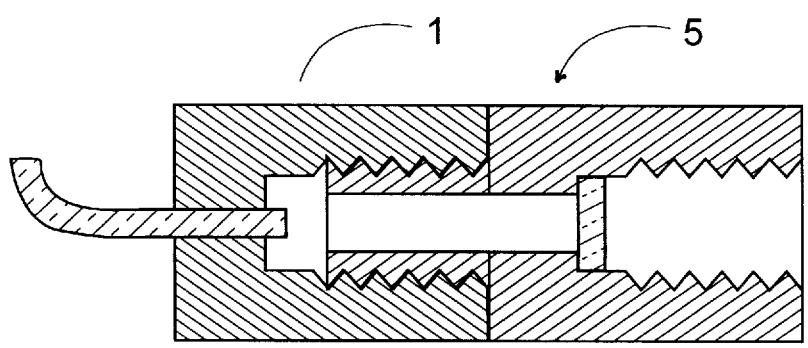
FIG. 6 is a sectional view of a filtering connection of the present invention attached to a conventional fiberoptic bundle connection.

Referring to FIG. 6, a filtering connection 5 of the present invention is shown connected to a typical conventional fiberoptic bundle connection 1.

Body 6 is made of any convenient material such as brass, aluminum, steel, plastic, ceramic, fiber composite, and stainless steel. The dimensions such as exterior diameters, wall thicknesses, and bore depth are design parameters well understood by one of ordinary skill given the standard thread for a particular light source and the choice of material, and are calculable.

Although optical element 8 is shown as a single element such as a spectral filter or a neutral density filter, other optical elements that are composed of multiple optical subelements or components are contemplated by the present invention. Such multiple subelement optical elements include collimating optics together with a spectral filter. Such combinations might be needed to adjust for different fiberoptic bundle diameters and setback distances from the light source output opening. Such combinations can include at least one lens in order to control light geometry.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A filtering connection to connect a fiberoptic bundle connection to a standard thread, said filtering connection comprising:

a body having a stepped bore extending from a first side of said body to an opposite side of said body, said stepped bore having at least two interior diametered portions, a larger interior diametered portion extending from a larger opening on said first side of said body, and a smaller interior diametered portion extending from a smaller opening on said opposite side of said body;

a standard threaded portion formed on said larger interior diametered portion and extending from said larger opening;

a standard threaded portion formed on said body concentric to said smaller opening and extending from said opposite side;

an optical element coaxial to said stepped bore and positioned in close proximity to an end of said larger interior diametered portion away from said larger opening; and at least one set screw positioned in at least one set screw hole, said set screw hole positioned to secure said optical element, in close proximity to said end of said larger interior diametered portion, when said set screw is tightened in said set screw hole.

2. A filtering connection to connect a fiberoptic bundle connection to a standard thread according to claim 1, wherein said optical element is a spectral filter.

3. A filtering connection to connect a fiberoptic bundle connection to a standard thread according to claim 1, wherein said optical element is multicomponent.

4. A filtering connection to connect a fiberoptic bundle connection to a standard thread according to claim 3, wherein said multicomponent optical element includes at least one lens.

5. A filtering connection to connect a fiberoptic bundle connection to a standard thread, said filtering connection comprising:

a body having a stepped bore extending from a first side of said body to an opposite side of said body, said stepped bore having at least two interior diametered portions, a larger interior diametered portion extending from a larger opening on said first side of said body, and a smaller interior diametered portion extending from a smaller opening on said opposite side of said body;

a standard threaded portion formed on said larger interior diametered portion and extending from said larger opening;

a standard threaded portion formed on said body concentric to said smaller opening and extending from said opposite side;

an optical element coaxial to said stepped bore and positioned in close proximity to an end of said larger interior diametered portion away from said larger opening; and an O-ring effective to secure said optical element in close proximity to said end of said larger interior diametered portion.

6. A filtering connection to connect a fiberoptic bundle connection to a standard thread according to claim 5, wherein said stepped bore includes an O-ring groove to seat said O-ring therein.

7. A filtering connection to connect a fiberoptic bundle connection to a standard thread according to claim 5, wherein said optical element is a spectral filter.

8. A filtering connection to connect a fiberoptic bundle connection to a standard thread according to claim 5, wherein said optical element is multicomponent.

9. A filtering connection to connect a fiberoptic bundle connection to a standard thread according to claim 8, wherein said multicomponent optical element includes at least one lens.

10. A filtering connection to connect a fiberoptic bundle connection to a standard thread, said filtering connection comprising:

a body having a stepped bore extending from a first side of said body to an opposite side of said body, said stepped bore having at least two interior diametered portions, a larger interior diametered portion extending from a larger opening on said first side of said body, and a smaller interior diametered portion extending from a smaller opening on said opposite side of said body;

a standard threaded portion formed on said larger interior diametered portion and extending from said larger opening;

a standard threaded portion formed on said body concentric to said smaller opening and extending from said opposite side;

an optical element coaxial to said stepped bore and positioned in close proximity to an end of said larger interior diametered portion away from said larger opening; and a retaining ring coaxial to said stepped bore effective to secure said optical element in close proximity to said end of said larger interior diametered portion when said retaining ring is tightened in said larger interior diametered portion.

11. A filtering connection to connect a fiberoptic bundle connection to a standard thread according to claim 10, wherein said optical element is a spectral filter.

12. A filtering connection to connect a fiberoptic bundle connection to a standard thread according to claim 10, wherein said optical element is multicomponent.

13. A filtering connection to connect a fiberoptic bundle connection to a standard thread according to claim 12, wherein said multicomponent optical element includes at least one lens.

* * * * *